US006428188B1

(12) United States Patent
Magno, Jr. et al.

(10) Patent No.: US 6,428,188 B1
(45) Date of Patent: Aug. 6, 2002

(54) LIGHT FIXTURE FOR A CEILING FAN

(75) Inventors: Jose Maria D. Magno, Jr.; Patrick D. Szlachtowski, both of Cordova, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 09/464,187

(22) Filed: Dec. 16, 1999

(51) Int. Cl.[7] .................................... B60Q 3/04

(52) U.S. Cl. ..................... 362/362; 362/363; 362/362; 362/374; 362/375; 362/365; 362/404; 362/253

(58) Field of Search ......................... 362/96, 363, 374, 362/375, 362, 365, 147, 404, 253; 416/5; 454/294

(56) References Cited

U.S. PATENT DOCUMENTS

| | | | | |
|---|---|---|---|---|
| 1,008,344 A | | 11/1911 | Larzelere | |
| 1,089,869 A | | 3/1914 | Ripley | |
| 1,746,339 A | | 2/1930 | Doane | |
| 1,769,481 A | | 7/1930 | Zahm | |
| 3,108,753 A | | 10/1963 | Coffey | 240/128 |
| 3,524,981 A | | 8/1970 | Auerbach | 240/128 |
| 4,099,224 A | | 7/1978 | Valpey | 362/433 |
| 4,175,282 A | | 11/1979 | Grindle et al. | 362/363 |
| 4,428,032 A | | 1/1984 | Workman | 362/96 |
| 4,754,383 A | | 6/1988 | Klaus | 362/363 |
| 4,764,855 A | | 8/1988 | Fretz, III et al. | 362/433 |
| 5,034,869 A | | 7/1991 | Choi | 362/363 |
| 5,491,618 A | * | 2/1996 | Vakil | 362/147 |
| 5,653,532 A | * | 8/1997 | Chan | 362/453 |

* cited by examiner

*Primary Examiner*—Sandra O'Shea
*Assistant Examiner*—Bertrand Zeade
(74) *Attorney, Agent, or Firm*—Baker, Donelson, Bearman & Caldwell

(57) ABSTRACT

A light fixture is provided which is mountable to an overhead structure, such as a switch housing of a ceiling fan. The light fixture includes a base which may be attached to the switch housing and a globe which is removably secured to the base. The base includes a plate and an annular flange extending downwardly from the plate, with a plurality of circumferentially spaced and radially inwardly extending protuberances formed on the flange. A plurality of circumferentially spaced resilient members are attached to the plate proximate the flange. The globe includes a neck and a light-emitting enclosure integral with one another, with the neck having a substantially cylindrical portion and a plurality of circumferentially extending ridges, spaced apart by gaps, which protrude radially outwardly from an outer surface of the substantially cylindrical portion of the neck. Each ridge includes a reduced height portion and a circumferential stop formed at one end thereof, and further includes an upwardly extending notch formed therein and disposed adjacent to the stop. The globe may be installed by aligning the protuberances formed on the base with the gaps separating the ridges on the globe and then forcing the globe upward to overcome the resilient members and rotating the globe relative to the base until the protuberances contact the circumferential stops. The globe may then be released, with the resilient members forcing the globe downward so the protuberances engage the notches and releasably lock the globe in position relative to the base.

7 Claims, 10 Drawing Sheets

LIGHT FIXTURE FOR A CEILING FAN

BACKGROUND

1. Field of the Invention he present invention relates generally to light fixtures and, more particularly to an overhead mounted light fixture. Although the advantages of the present invention may be realized when the light fixture is mounted to a variety of overhead structures, the light fixture of the present invention is particularly well suited for use as a light fixture for a ceiling fan.

2. Related Art ceiling fan light fixtures typically include one or more light globes, with each globe being retained by a mount structure affixed to the ceiling fan. The light globes typically include a lower portion which may include an ornament design and may assume a variety of shapes and configurations, and a substantially cylindrical portion attached to and extending upwardly from the lower portion. The light globes of conventional ceiling fan light fixtures are typically retained in one of the following two ways. A plurality of circumferentially spaced screws may be used, with the screws protruding radially inwardly through a cylindrical flange of the mount structure affixed to the fan, until they are in contacting engagement with the neck portion of the light globe. The light globe is then retained in place by the friction created by the contacting engagement between the mount screws and the neck portion of the light globe. In other conventional ceiling fan light fixtures, the substantially cylindrical neck portion of the light globe includes a hclical threaded portion which engages protuberances in an annular flange of the mount structure.

Both of the foregoing conventional ceiling fan light fixtures are subject to various disadvantages. For instance, it is somewhat awkward to handle the relatively small screws and install them through the mount structure into contacting engagement with the light globe, while reaching overhead or working from a ladder. Additionally, this installation scheme may result in the light globe being off center somewhat relative to the remainder of the ceiling fan. Also, during operation of the ceiling fan, the light globe is subject to disengagement from the mount structure as a result of the mount screws becoming loose due to ceiling fan vibration. Similarly, with regard to the conventional ceiling fan light fixture using helical threads on the light globe, ceiling fan vibration during operation may cause the globe to back off or rotate out of the mount structure and therefore fall to the floor.

In the light fixture art in general, various devices have been used to allow the light globe to be rotated into a “locked” position and include devices incorporating resilient members such as springs. However, these devices are typically complex and therefore costly, requiring multiple components which may be difficult to manufacture. Also, the “locking” features of these devices may not be suitable for use in an application such as a ceiling fan since the “locking” feature may not be sufficient to retain the globe of the fixture due to the vibration of the ceiling fan.

In view of the foregoing deficiencies associated with known light fixtures in general, and light fixtures for ceiling fans in particular, there remains a need for a simple, easy to install and reliable light fixture for a ceiling fan which may be removably secured to the ceiling fan and locked in position until such time that the user desires to remove the light globe.

SUMMARY

In view of the foregoing needs, the present invention is directed to a simple, easy to install and reliable light fixture which is secured to an overhead structure such as a stationary portion of a ceiling fan. The light fixture includes a base, which may be attached to a switch housing of the ceiling fan, and a globe which may be removably secured to the base and locked in position so as to retain the globe during the operation of the ceiling fan. The globe may be simply installed by aligning a plurality of circumferentially spaced gaps which exist on an exterior of a neck portion of the globe with a like number of circumferentially spaced protuberances on the base, pushing the globe upward somewhat to overcome a plurality of resilient members attached to the base, and rotating the globe until the user feels the protuberances on the base contacting circumferential stops disposed on the neck portion of the globe. The installer may then release the globe, with the resilient members forcing the globe downward into a locked position. The particular configuration of the globe and base permit simple installation, while providing reliable retention of the globe within the base during operation of the ceiling fan, such that the globe is not subject to disengagement from the base due to the vibration of the ceiling fan.

According to a preferred embodiment, the light fixture of the present invention includes a base which is attached to an overhead structure, such as the switch housing of a ceiling fan, and a globe which is removably secured to the base. The base includes a plate, having upper and lower surfaces, and including a radially outer annular ring portion and a central portion integral with the ring portion. The base further includes an annular flange with is integral with and extends downwardly from the ring portion of the plate. The flange includes a plurality of circumferentially spaced and radially inwardly extending protuberances, with the flange combining with the lower surface of the plate to form an annular channel.

The base further includes a plurality of circumferentially spaced resilient members, which may comprise metal leaf springs, attached to the ring portion and disposed in the annular channel. The resilient members are circumferentially spaced from the protuberances formed on the annular flange of the base. Each of the leaf springs includes a first end which is attached to the ring portion by conventional means such as a rivet, and includes an opposite end which is free to deflect. Each leaf spring further includes a downwardly extending, arcuate portion extending between and connected to the first, fixed end and the opposite, free end.

The globe of the light fixture is preferably made of glass, but may be made of other light-emitting materials, and includes a neck and a light-emitting enclosure integral with the neck. The neck includes a substantially cylindrical portion having radially inner and outer surfaces, and further includes a plurality of circumferentially extending ridges. The ridges are circumferentially spaced from one another so as to form a plurality of circumferentially spaced gaps and are integral with and protrude radially outwardly from an outer surface of the substantially cylindrical portion of the neck. Each of the ridges terminates at one end thereof in a circumferential stop which extends longitudinally below a remaining portion of the ridge. Each of the ridges further includes an upwardly extending notch formed therein and disposed circumferentially adjacent to one of the stops. The neck of the globe further includes an annular upper lip, which is formed in part by the ridges.

The light-emitting enclosure of the globe includes a lower portion, and an upper annular flange portion integral with the lower portion and with the neck of the globe. In one preferred embodiment, the lower portion of the enclosure may comprise a substantially conical portion. However, in other embodiments, the lower end portion of the enclosure may assume a variety of other shapes and configurations.

The protuberances of the annular flange of the base are aligned with the circumferentially spaced gaps formed by the ridges of the neck of the globe, when the globe and base are disposed in a pre-assembled position relative to one another. The globe is rotatable relative to the base, from the pre-assembled position to an installed, locked position by forcing the globe upward to overcome the resilient members attached to the base, whereby the protuberances formed in the annular flange of the base are disposed below the reduced height portion of the ridges formed on the neck portion of the globe. The globe may then be rotated relative to the base until the protuberances contact the circumferential stops formed at one end of each ridge, and then releasing the globe, whereby the resilient members contact the lip of the neck and force the globe downward so that the protuberances engage the notches formed in the ridges and releasably lock the globe in position relative to the base.

The light fixture further includes a reflector assembly including a reflector plate attached to the lower surface of the central portion of the base, and further including a bracket attached to the reflector plate. A light socket is attached to the bracket and is effective for receiving a light bulb, such as a halogen bulb in a preferred embodiment.

BRIEF DESCRIPTION OF THE DRAWINGS

These and other features, aspects and advantages of the present invention will become better understood with regard to the following description, appended claims and accompanying drawings, wherein:

DETAILED DESCRIPTION

Figure 1:
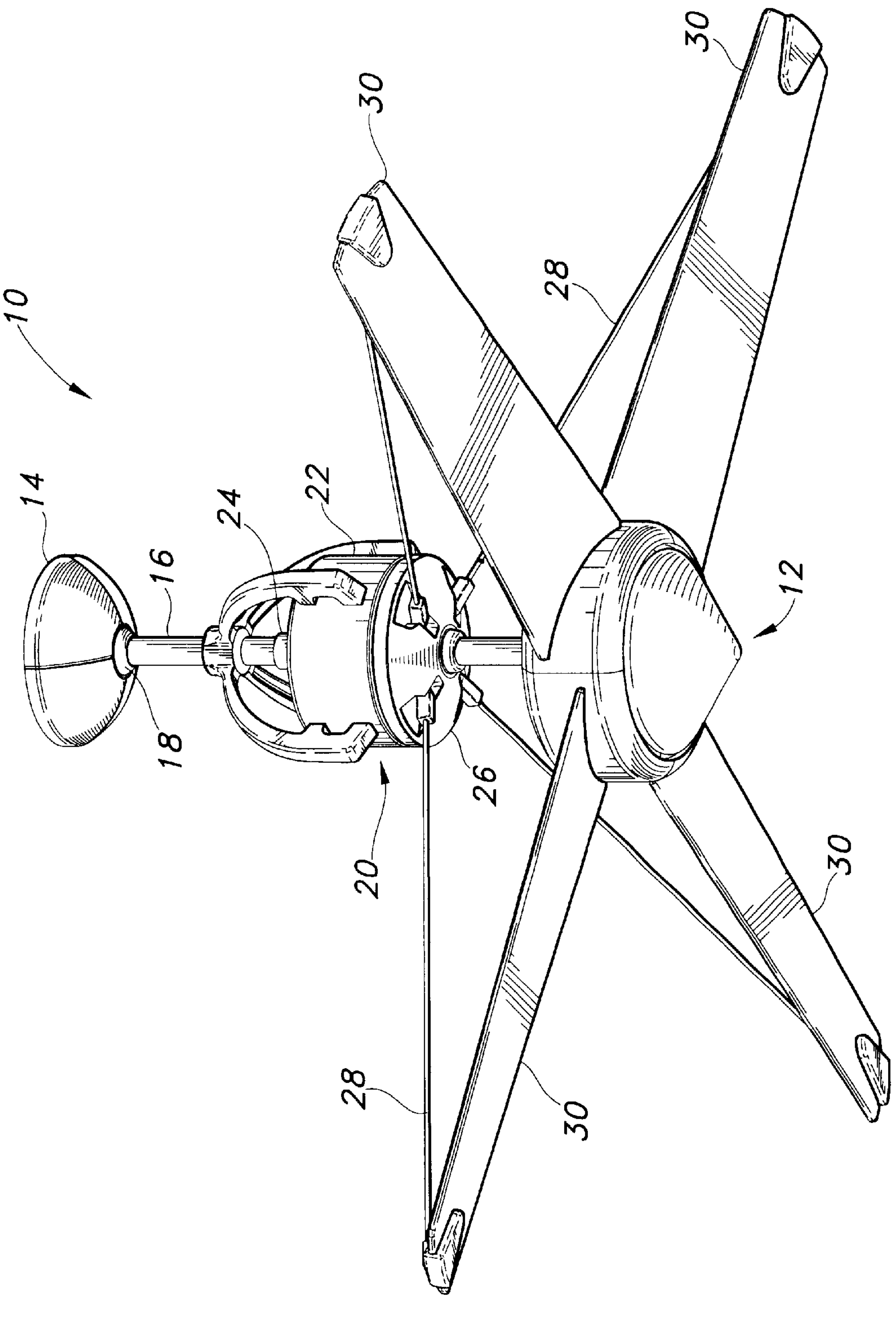
FIG. 1 is a perspective view illustrating a ceiling fan incorporating a light fixture according to the present invention.

Referring now to the drawings, wherein like reference numerals have been used for similar elements throughout, FIG. 1 is a perspective view illustrating a ceiling fan 10 which incorporates a light fixture 12 according to the present invention. It should be understood that the particular features of ceiling fan 10 do not form a part of the present invention and are shown by way of illustration, not of limitation. For instance, as discussed subsequently, ceiling fan 10 includes a "standard configuration" electric motor, i.e., one in which the rotor is disposed radially inward of the stator. However, the light fixture of the present invention may be advantageously utilized in conjunction with a wide variety of other ceiling fans, including those having "inside-out" electric motors, i.e., ones in which the rotor is disposed radially outward of the stator. Furthermore, the light fixture according to the present invention may be used in conjunction with ceiling fans having a wide variety of configurations with regard to the included motor housing, blade irons, fan blades, etc. As yet another alternative, the light fixture according to the present invention may be mounted directly to overhead structures other than those comprising a stationary portion of a ceiling fan. For instance, the light fixture according to the present invention may be mounted directly to a ceiling of a structure or to a mount plate affixed to the ceiling.

In the illustrative embodiment, ceiling fan 10 is suspended from a ceiling (not shown) of a residential or commercial structure, by a canopy 14 and downrod 16 arrangement. A ball 18 is affixed to an upper end of the downrod 16 and is pivotally disposed within a seat (not shown) formed in the canopy 14 to allow the ceiling fan 10 to pivot somewhat, for instance to accommodate a vaulted or sloped ceiling. The downrod 16 supports an electric motor 20 which comprises a "standard configuration" motor in the illustrative embodiment, since motor 20 includes a stator 22 which is disposed radially outward of a rotor of motor 20. The downrod 16 is attached at a lower end to an adapter 24, which in turn is connected to the stator 22, thereby providing support to motor 20. The rotor of motor 20 includes a lower end cap 26 which includes a plurality of apertures formed therein to accept an upper end of struts 28 which are attached to the rotor and rotate therewith during operation of fan 10. Ceiling fan 10 further includes a plurality of fan blades 30 which are attached at an inner end to a rotating portion of ceiling fan 10 as subsequently discussed. As shown in FIG. 1, a lower end of each strut 28 is attached to a radially outward end of the corresponding fan blade 30.

Figure 2:
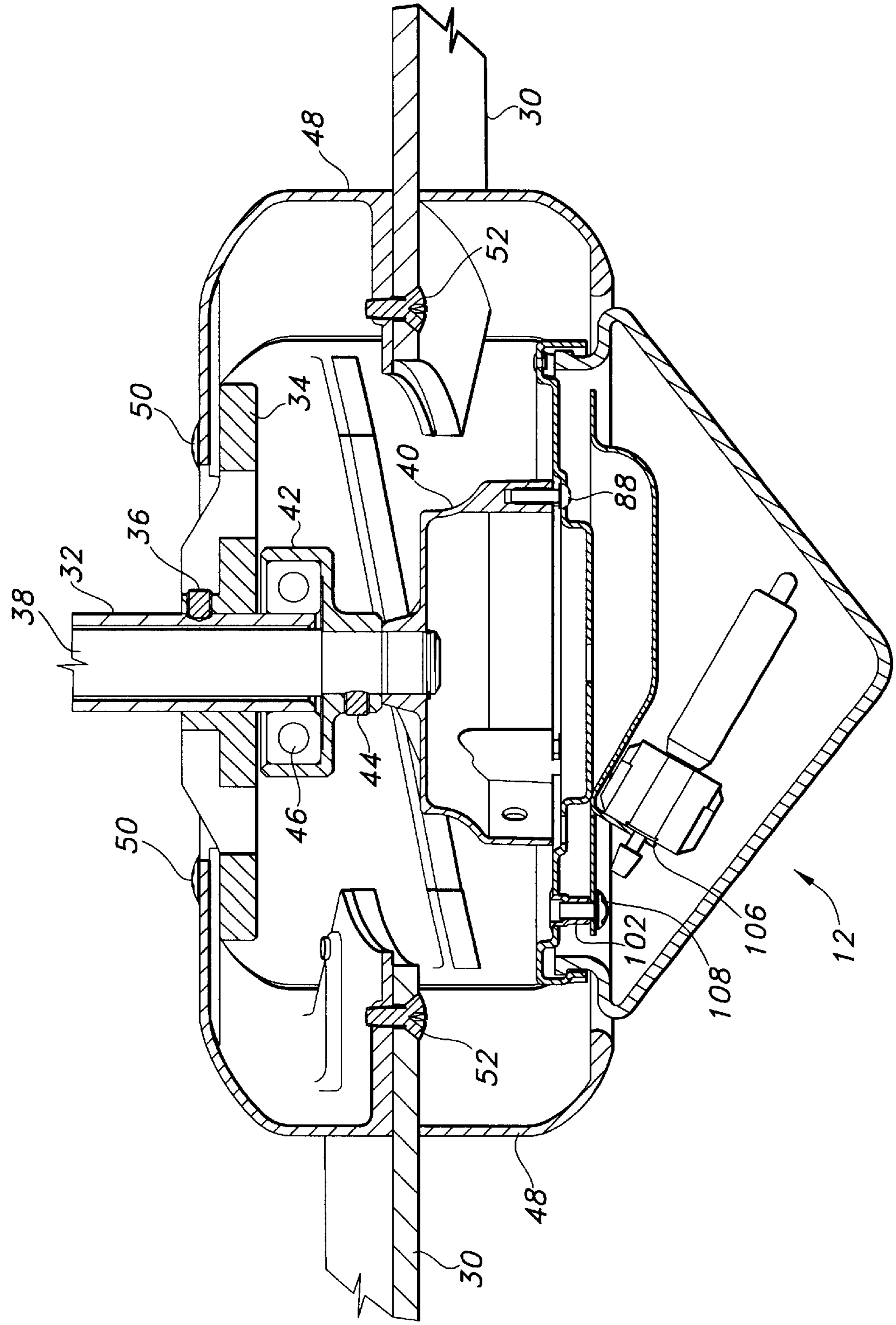
FIG. 2 is a cross-sectional view illustrating a portion of the ceiling fan shown in FIG. 1, and including the light fixture according to the present invention.

As shown in FIGS. 1 and 2, motor 20 of ceiling fan 10 further includes an output shaft 32 which rotates with the rotor of motor 20 and extends below the lower end cap 26 of motor 20. The output shaft 32 is attached, at a lower end thereof, to a flywheel 34 in a conventional manner, such as with a plurality of set screws 36 (one shown in FIG. 2). Accordingly, the flywheel 34 rotates with the rotor of motor 20. The output shaft 32 is coaxially disposed about a stationary shaft 38 which extends downward from the stator 22 and includes a threaded lower end which is used to attach the shaft 38 to a switch housing 40 of ceiling fan 10. A bearing housing 42 is attached to the stationary shaft 38, proximate the lower end, via one or more set screws 44. The lower end portion of the rotatable output shaft 32 is journalled within bearings 46 contained within the bearing housing 42.

Ceiling fan 10 further includes a plurality of blade irons 48, with each blade iron 48 being attached to the flywheel 34 by a plurality of fasteners 50. Each of the fan blades 30 is attached at a radially inner end thereof to one of the blade irons 48, via one or more fasteners such as screws 52. Accordingly, the fan blades 30 rotate with the blade irons 48, flywheel 34 and the output shaft 32 of motor 20.

Although not shown in FIG. 2, switch housing 40 may be used to contain the electrical switches and wiring used to control power to motor 20 and light fixture 12, as well as the rotating speed of motor 20. The necessary wiring may be routed upward through a hollow interior of shaft 38 to motor 20. Electrical power available within the structure from which ceiling fan 10 is suspended, is provided to ceiling fan 10 through a hollow interior of canopy 18 via wiring not shown, with the wiring then extending downward through a hollow interior of downrod 16.

Figure 3:
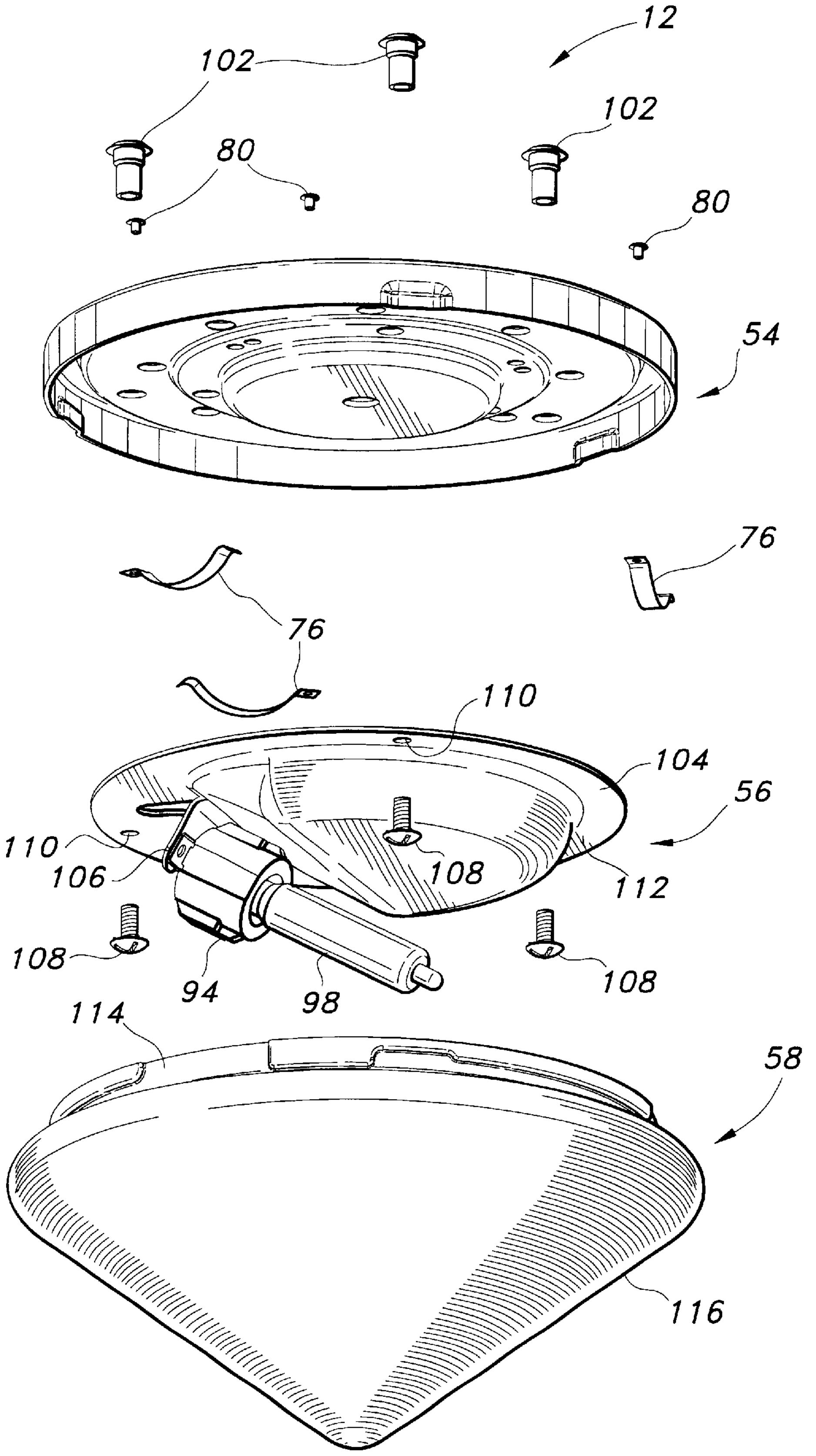
FIG. 3 is an exploded assembly view further illustrating the light fixture according to the present invention which is illustrated in FIGS. 1 and 2.

FIG. 3 is an exploded assembly view of the light fixture 12 according to the present invention. Light fixture 12 includes a base 54, a reflector assembly indicated generally at 56, which is attached to base 54, and a globe 58 which is removably secured to the base 54 as discussed subsequently in further detail. In the illustrative embodiment, base 54 is attached to the switch housing 40 of ceiling fan 10. However, it should be understood, that the base 54 may be attached to other overhead structures, such as a mount plate attached to a ceiling. Referring now to FIGS. 2–6, base 54 includes a plate 60 having a radially outer annular ring portion 62 and a central portion 64 integral with the ring portion 62. Plate 60 includes upper 66 and lower 68 surfaces. In the illustrative embodiment, plate 60 has a stepped configuration, such that the outer annular ring portion 62 is disposed above the central portion 64 of plate 60. Base 54 further includes an annular flange 70 which is integral with and extends downwardly from the outer, annular ring portion 62 of plate 60. Flange 70 includes a plurality of circumferentially spaced and radially inwardly extending protuberances 72 which are used for subsequently described purposes. The annular flange 70 combines with the lower surface 68 of plate 60 to form an annular channel 74.

Figure 4:
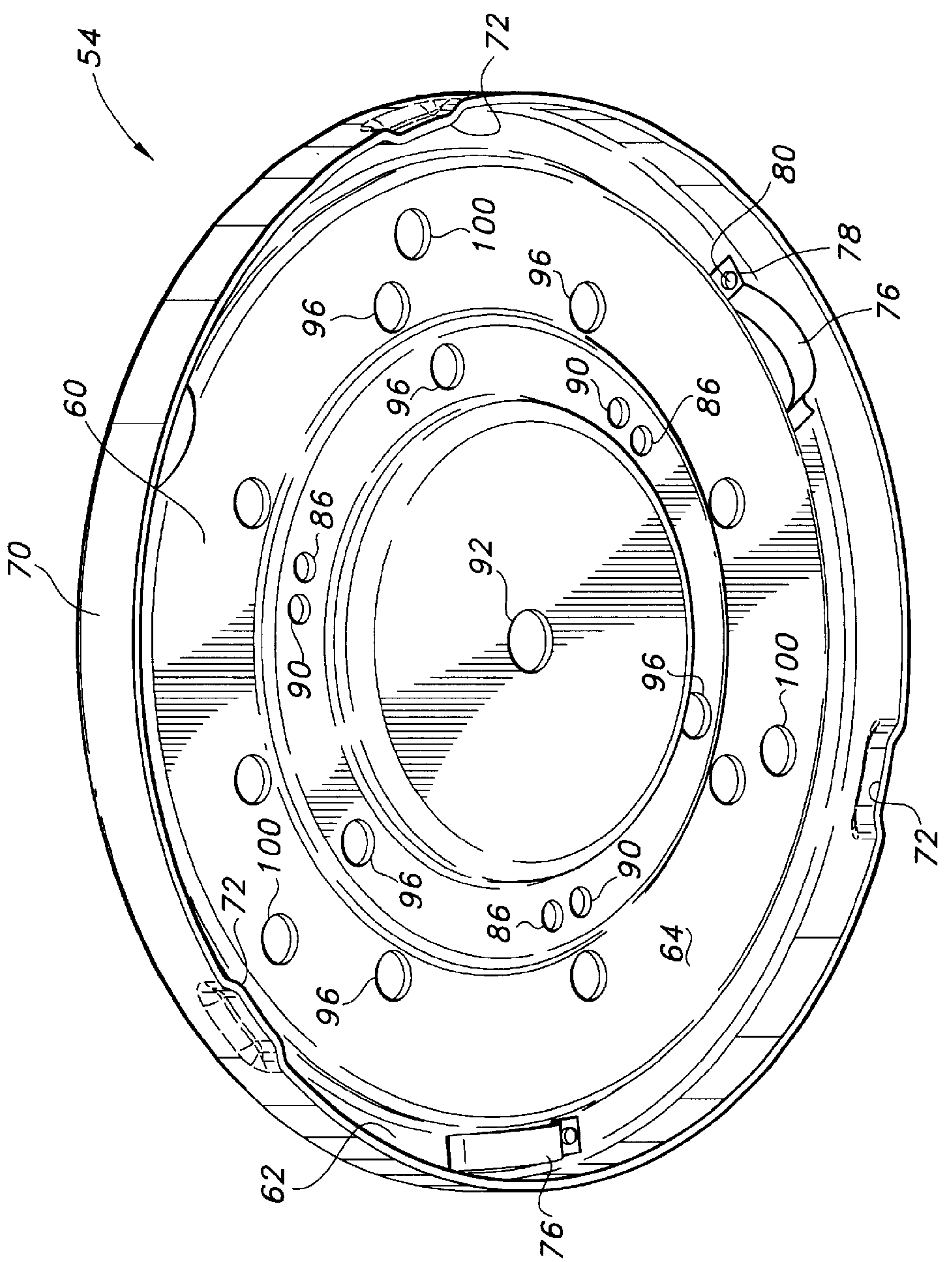
FIG. 4 is a perspective view of the base included in the light fixture according to the present invention which is illustrated in FIGS. 2 and 3.
Figure 5:
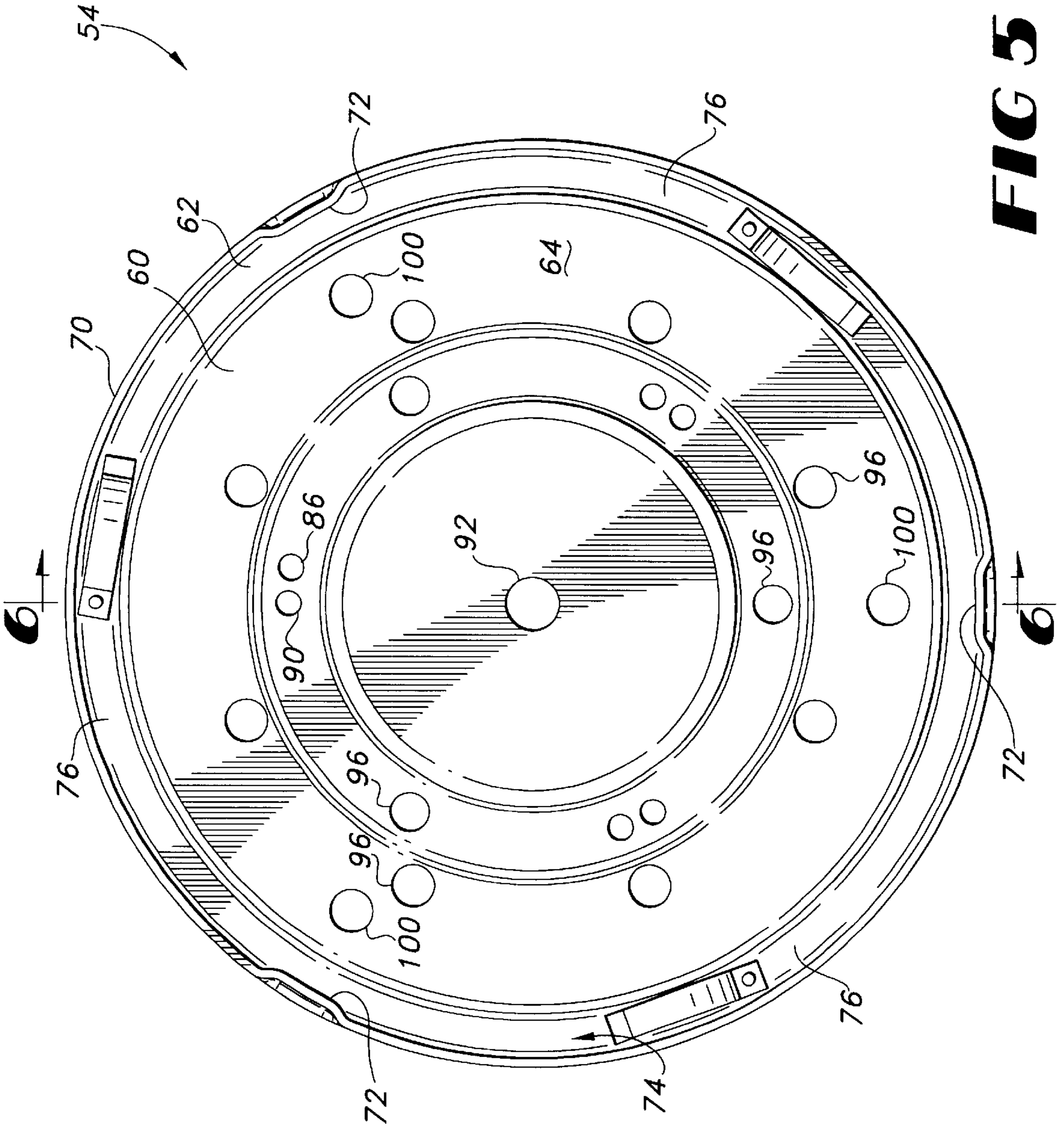
FIG. 5 is a bottom plan view of the base shown in FIGS. 2–4.
Figure 6:
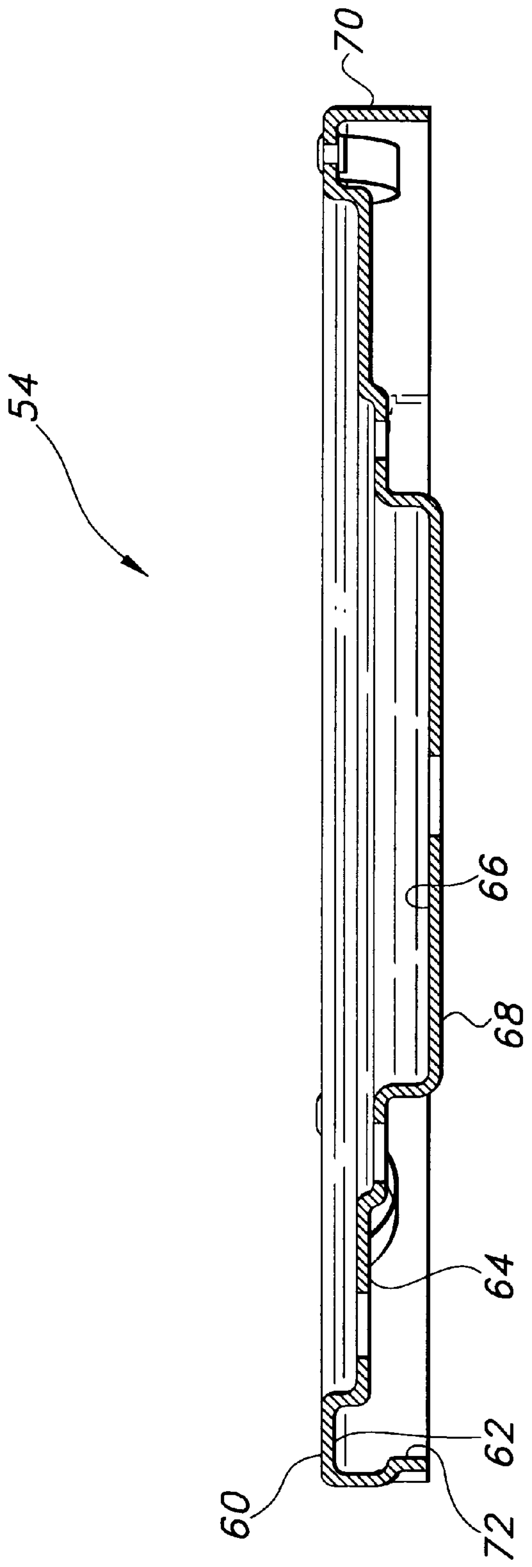
FIG. 6 is a cross-sectional view of the base taken along lines 6—6 in FIG. 5.

The base 54 further includes a plurality of circumferentially spaced resilient members 76 which are attached to the ring portion 62 of plate 60, and are disposed in the annular channel 74. As shown in FIGS. 4 and 5, the resilient members 76 are circumferentially spaced from the protuberances 72 of flange 70 for ease of assembly of globe 58 to base 54. Base 54 is preferably made of metal, such as aluminum, or a metallic alloy. The resilient members 76 are also preferably made of metal and, in a preferred embodiment, comprise metal, leaf springs. However, resilient members 76 may alternatively comprise coil springs, rubber bushings or other members which may exert an opposing force on globe 58 when globe 58 is assembled to base 54. Each of the leaf springs 76 includes a first end portion 78 which is attached to the ring portion 62 of plate 60. In the illustrative embodiment, the first end 78 of each leaf spring 76 is attached to the ring portion 62 by a rivet 80. However, the end portion 78 could be attached to the ring portion 62 using other conventional means. For instance, each end portion 78 may be bonded or welded to the ring portion 62. Each leaf spring 76 includes an opposite, free end portion 82 and a downwardly extending, arcuate portion 84 which extends between and connects the first, fixed end portion 78 and the opposite, free end portion 82 of leaf spring 76. The leaf spring 76 interacts with the globe 58 light fixture 12, as subsequently discussed in greater detail.

Base 54 includes a plurality of circumferentially spaced holes 86 which are formed in and extend through the central portion 64 of plate 60 of base 54. Each hole 86 comprises a clearance hole and is effective for receiving a fastener, such as a screw 88 as shown in FIG. 2, with screws 88 being used to attach base 54 to the switch housing 40 of ceiling fan 10. The base 54 may also include a plurality of circumferentially spaced holes 90, with each hole 90 comprising a relatively close tolerance hole and being effective for receiving a dowel pin (not shown). The dowel pins are preferably integral with the switch housing and may be inserted through holes 90 so as to align the base 54 with the switch housing 40. Base 54 also includes a centrally disposed hole 92 which is effective for passing electrical wiring (not shown) from the interior of the switch housing 40 to a light socket 94 included in the light fixture 12.

Base 54 further includes a plurality of circumferentially spaced holes 96, which comprise vent holes and are used to dissipate heat generated by a light bulb 98 included in the light fixture 12. Alternatively, the base 54 may include a plurality of circumferentially spaced vent slots, having a variety of shapes, in lieu of vent holes 96. Base 54 also further includes a plurality of circumferentially spaced holes 100, with each of the holes 100 being effective for receiving an insert 102 (one shown in FIG. 2), having internal threads. The reflector assembly 56 includes a reflector plate 104 and a bracket 106 attached to the reflector plate 104. As shown in FIG. 2, each of the threaded inserts 102 abuts an upper surface of the reflector plate 104. The light fixture 12 further includes a plurality of conventional fasteners, such as screws 108 which are used to attach the reflector plate 104 of reflector assembly 56 to the base 54. This is accomplished by inserting each screw 108 through a clearance hole 110 formed in the reflector plate 104, and threading each screw 108 into the corresponding threaded insert 102.

Figure 7:
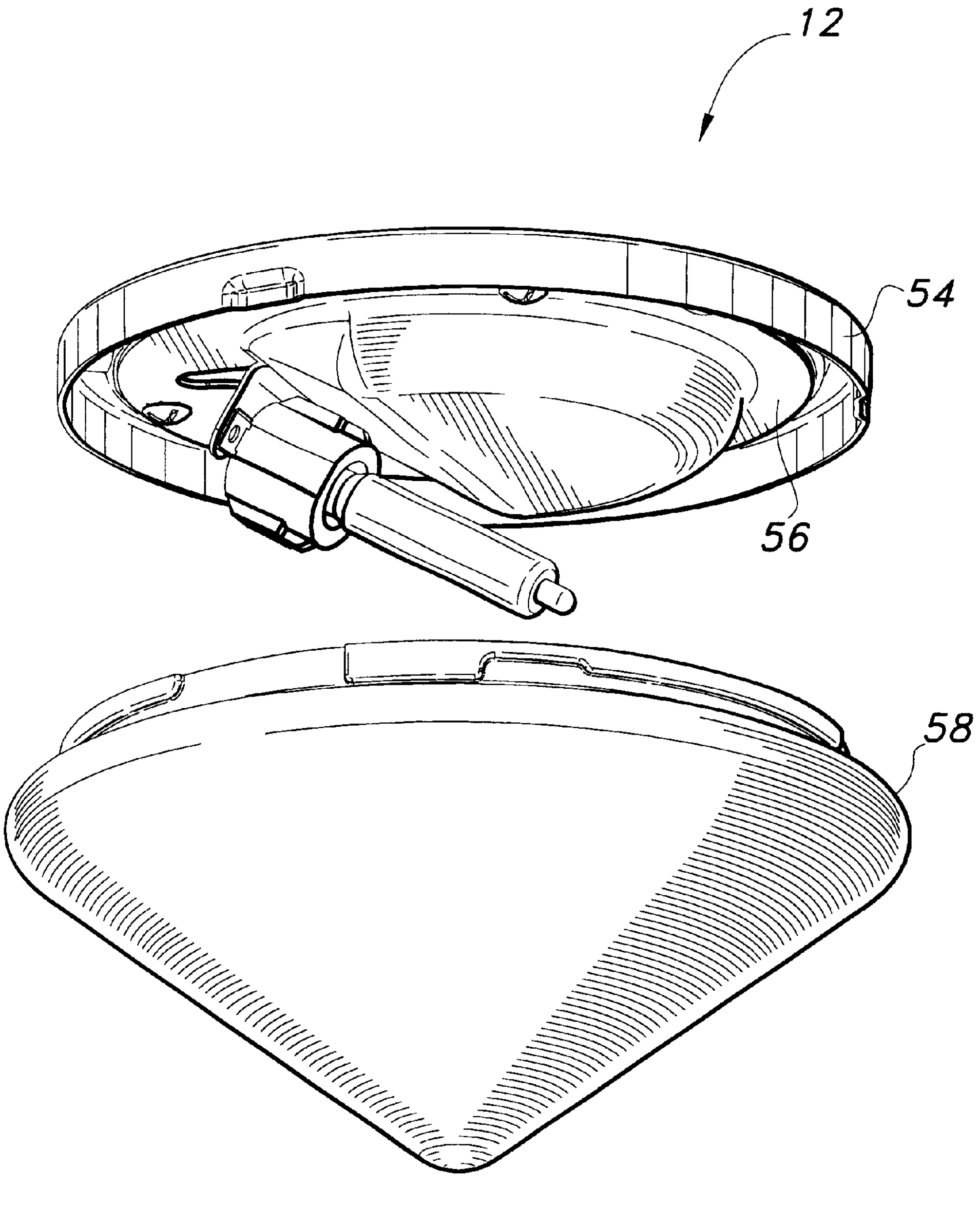
FIG. 7 is an exploded assembly view further illustrating the light fixture according to the present invention which is illustrated in FIGS. 1–6.

The reflector plate 104 is preferably made of metal such as aluminum, or a metallic alloy, and includes a highly reflective lower surface 112 which reflects light emitted from bulb 98 downward through globe 58. Alternatively, reflector plate 104 may be made of other materials, such as plastic, provided these alternate materials possess sufficient rigidity when bulb 98 is illuminated. In this event, it may be necessary to add a reflective material to the lower surface of the alternate material of plate 104. The light socket 94 is conventional in construction and is attached to bracket 106 by conventional means such as fasteners (not shown). In the illustrative embodiment, light bulb 98 comprises a halogen light bulb. However, it is within the scope of the present invention, to use bulbs other than halogen bulbs in the light fixture 12. FIG. 7 is an exploded assembly view illustrating the light fixture 12 with the reflector assembly 56 attached to base 54 in the manner discussed previously, but with globe 58 disengaged from base 54.

Figure 8:
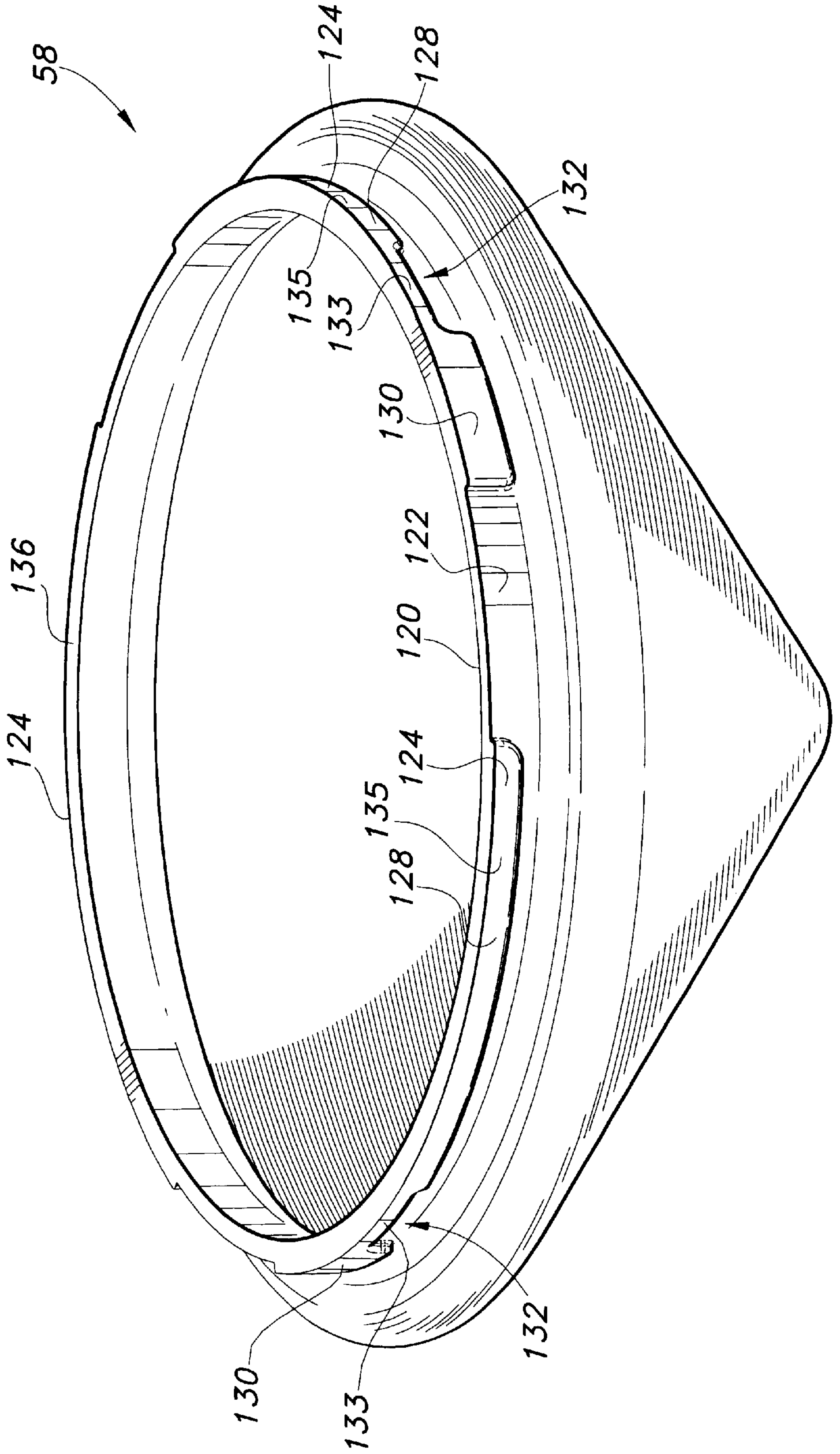
FIG. 8 is a perspective view of the globe included in the light fixture according to the present invention which is illustrated in FIGS. 1–3 and 7.
Figure 9:
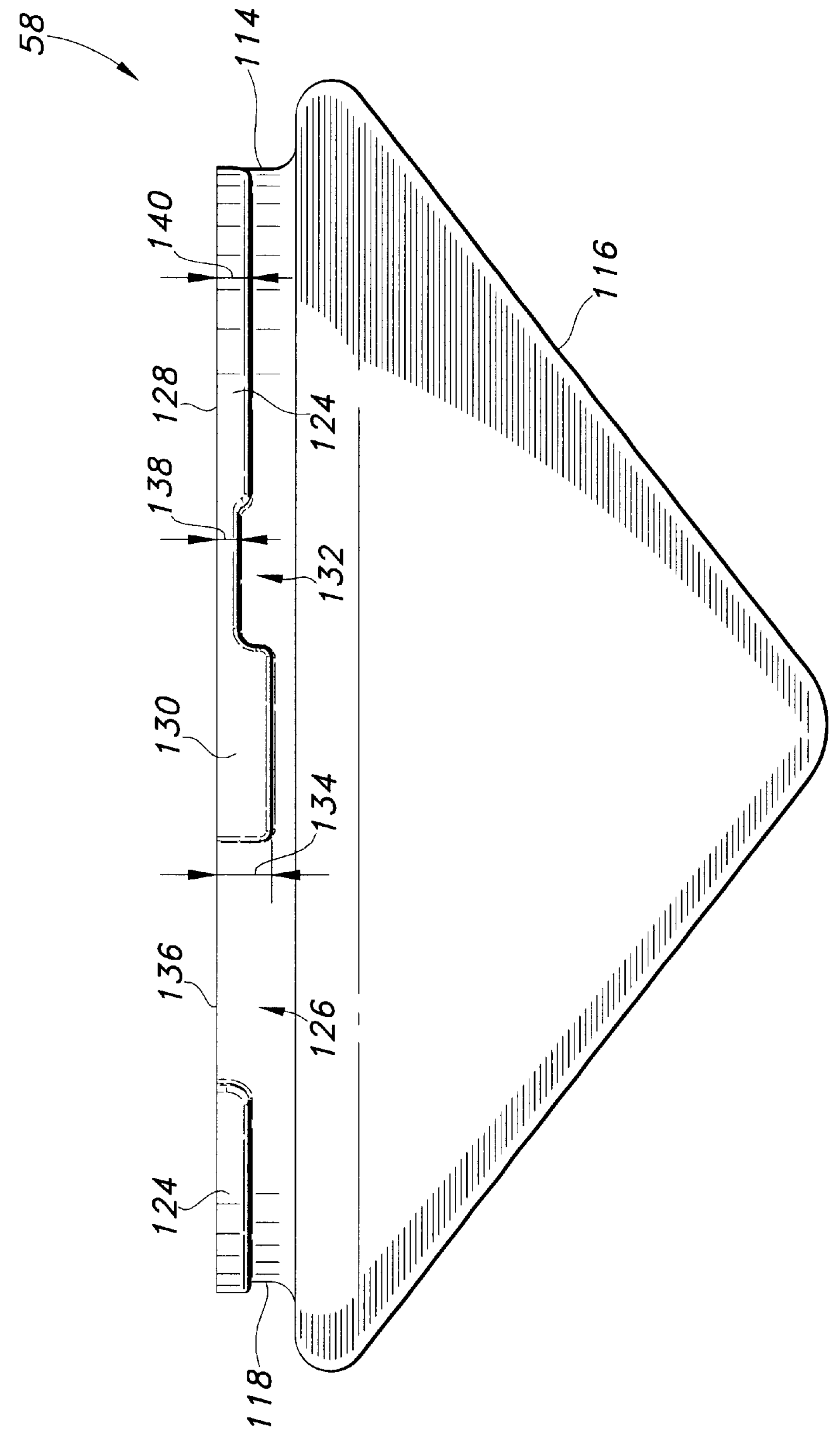
FIG. 9 is an elevational view of the globe shown in FIG. 8.
Figure 10:
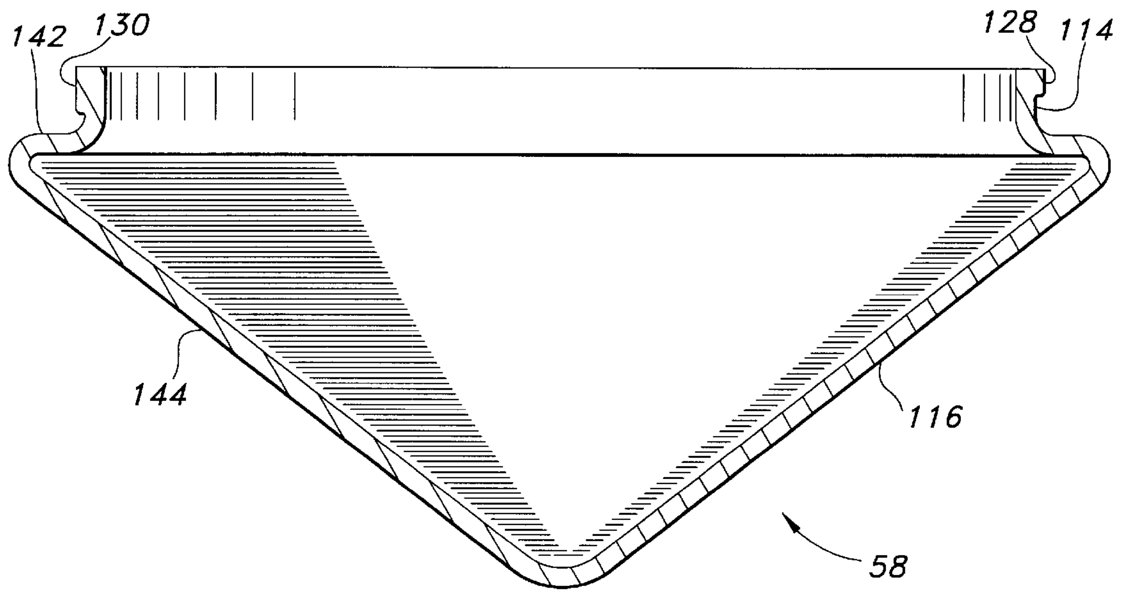
FIG. 10 is a cross-sectional view of the globe shown in FIGS. 8 and 9.

Referring now to FIGS. 8–10, the globe 58 includes a neck 114 and a light-emitting enclosure 116 which is integral with the neck 114. The neck 114 includes a substantially cylindrical portion 118 having radially inner 120 and radially outer 122 surfaces. Then neck 114 further includes a plurality of circumferentially extending ridges 124 which are integral with and protrude radially outwardly from the radially outer surface 122 of the substantially cylindrical portion 118 of neck 114. As shown in FIGS. 8 and 9, the ridges 124 are circumferentially spaced from one another so as to form a plurality of circumferentially spaced gaps 126. Each of the ridges 124 includes a circumferentially extending reduced height portion 128 and further includes a circumferential stop 130 formed at one end of the ridge 124. The circumferential stop 130 is integral with and extends longitudinally below the reduced height portion 128 of the corresponding ridge 124. Each of the ridges 124 further includes an upwardly extending notch 132 formed therein and disposed circumferentially adjacent to the corresponding one of the circumferential stops 130, as shown in FIGS. 8 and 9. The reduced height portion 128 of each ridge 124 includes a first portion 133 in the area corresponding to notch 132 and a second, remaining portion 135 in the area away from notch 132. In the illustrative embodiment each of the circumferential stops 130 has a generally rectangular shape and includes a longitudinal height 134 as measured from an upper lip 136 of the neck portion 114. The first portion 133 of the reduced height portion 128 of each ridge 124 has a longitudinal height or thickness 138 while the second, remaining portion 135 of the reduced height portion 128 of each ridge 124 has a longitudinal height or thickness 140. As shown in FIG. 9, the longitudinal height or thickness 134 of circumferential stop 130 is greater than height 138 and height 140 of ridge 124. The interaction among the ridges 124 and the included notches 132 and circumferential stops 128, with the base 54 of the light fixture 12 are discussed subsequently.

The light-emitting enclosure 116 includes an upper, annular flange portion 142 and a lower portion 144 which is integral with the upper flange portion 142. The upper flange portion 142 is also integral with the neck 114 of globe 58 and extends radially outwardly from the neck 114. The neck 114 and light-emitting enclosure 116 of globe 58 are preferably made as a one-piece construction, with globe 58 preferably being made of glass. The glass which is used may either be transparent or translucent so as to permit the light emitted from bulb 98 to be transmitted through the light-emitting enclosure 116 of globe 58. Alternatively, in other embodiments, the globe 58 may be made of other transparent or translucent materials such as plastic. In the illustrative embodiment, the lower portion 144 of the light-emitting enclosure 116 is substantially conical. However, the lower portion 144 of the light-emitting enclosure 116 may have a wide variety of other shapes, such as a substantially spherical shape, for instance.

In a preferred embodiment, the reflector assembly 56 and base 54 are assembled to one another as discussed previously and shown in FIG. 7, with the base 54 then being attached to an overhead structure, such as the switch housing 40 of ceiling fan 10 as discussed and illustrated previously. The installer of the light fixture 12 may then simply and easily install globe 58 as follows. Globe 58 is rotated, with globe 58 disengaged from base 54, until the circumferential gaps 126 which exist between the ridges 124 of the neck 114 of globe 58 are aligned with the protuberances 72 formed on the annular flange 70 of base 54. This allows the installer to push the globe upward so the flange 70 is disposed in surrounding relationship with the neck 114. A slight upward force is necessary to overcome the spring force of leaf springs 76, so that leaf springs 76 flatten somewhat. This causes globe 58 to be disposed vertically relative to base 58 so that the protuberances 72 of base 58 are disposed vertically below the reduced height portions 128 of ridges 124. This permits the installer to rotate the globe 58 relative to base 54, for approximately one third of a turn, until each of the protuberances 72 contacts one of the circumferential stops 130 formed on the ridges 124.

Figure 12:
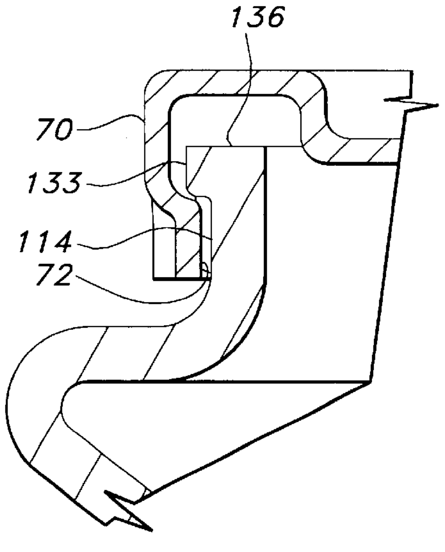
FIG. 12 is an enlarged, fragmentary cross-sectional view corresponding to a portion of the cross-sectional view in FIG. 2.
Figure 11:
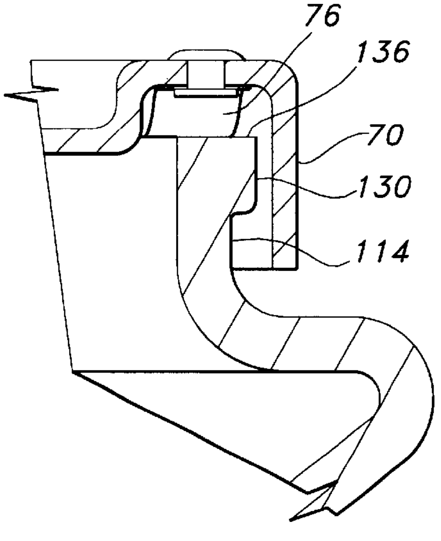
FIG. 11 is an enlarged, fragmentary cross-sectional view corresponding to a portion of the cross-sectional view in FIG. 2.

The installer may then release the slight upward force on globe 58. The leaf springs 76, which are disposed in contacting engagement with the upper lip 136 of neck 114 as shown in FIG. 11, force the globe 58 downward relative to the base 54 so that the protuberances 72 of base 54 engage the notches 132 of globe 58 as shown in FIG. 12, thereby releasably locking the globe 58 in position relative to base 54. When the user wishes to remove globe 58, for instance to change bulb 98, the foregoing procedure is reversed, i.e., an upward force is applied to globe 58 to overcome the leaf springs 76 and globe 58 is then rotated relative to base 54 until protuberances 72 are aligned with gaps 126. The globe 58 may then be disengaged from base 54.

While the foregoing description has set forth the preferred embodiments of the present invention in particular detail, it must be understood that numerous modifications, substitutions and changes can be undertaken without departing from the true spirit and scope of the present invention as defined by the ensuing claims. The invention is therefore not limited to specific preferred embodiments as described, but is only limited as defined by the following claims.

What is claimed is:

1. A light fixture mountable to an overhead structure, said light fixture comprising:

a base which is attached to the overhead structure; and a globe which is removably secured to said base; wherein said base includes a plate having a radially outer annular ring portion and a central portion integral with said ring portion, said plate having upper and lower surfaces;

said base further including an annular flange integral with and extending downwardly from said ring portion, said flange including a plurality of circumferentially spaced and radially inwardly extending protuberances, said flange combining with said lower surface of said plate of said base to form an annular channel;

said base further including a plurality of circumferentially spaced resilient members attached to said ring portion and disposed in said annular channel, said resilient members being circumferentially spaced from said protuberances of said annular flange;

said globe including a neck and a light-emitting enclosure integral with said neck, said neck including a substantially cylindrical portion having radially inner and radially outer surfaces, said neck further including a plurality of circumferentially extending ridges, said ridges being circumferentially spaced from one another so as to form a plurality of circumferentially spaced gaps, said ridges being integral with and protruding radially outwardly from said outer surface of said substantially cylindrical portion of said neck, each of said ridges including a reduced height portion and a circumferential stop formed at one end thereof, said circumferential stop being integral with and extending longitudinally below said reduced height portion of said ridge, each of said ridges further including an upwardly extending notch formed therein and disposed circumferentially adjacent to the corresponding one of said stops;

said neck further including an annular upper lip, said lip being formed in part by said ridges;

said protuberances of said flange of said base being aligned with said gaps formed by said ridges of said neck of said globe when said globe and said base are disposed in a pre-assembled position relative to one another, said globe being rotatable relative to said base from said pre-assembled position to an installed, locked position by forcing said globe upward to overcome said resilient members, whereby said protuberances are disposed below said reduced height portions of said ridges, and rotating said globe relative to said base until said protuberances contact said circumferential stops and then releasing said globe, whereby said resilient members contact said lip of said neck and force said globe downward whereby said protuberances engage said notches and releasably lock said globe in position relative to said base.

2. The light fixture as recited in claim 1, wherein:

said base is made of a material selected from the group consisting of metals, metallic alloys and plastics;

said globe is made of a light-emitting material.

3. The light fixture as recited in claim 1, wherein the overhead structure is a switch housing of a ceiling fan and wherein:

said base further includes a first plurality of circumferentially spaced holes which are effective for receiving fasteners to attach said base to the switch housing.

4. The light fixture as recited in claim 1, wherein:

said plate has a stepped configuration, with said outer annular ring portion being disposed above said central portion.

5. The light fixture as recited in claim 1, further comprising:

a reflector assembly including a reflector plate attached to said lower surface of said central portion of said base, said reflector assembly further including a bracket attached to said reflector plate and a light socket attached to said bracket.

6. The light fixture as recited in claim 1, wherein:

said plurality of resilient members comprises a plurality of leaf springs, each of said leaf springs being attached at one end thereof to said ring portion of said base, each of said springs including an opposite end which is free to deflect and a downwardly extending, arcuate portion extending between and connected to said first and said opposite ends.

7. The light fixture as recited in claim 1, wherein:

said light-emitting enclosure of said globe includes a lower portion and an upper, annular flange portion integral with said lower portion and said neck of said globe, said lower portion being substantially conical.

* * * * *